Nov. 8, 1949 A. W. BENNETT 2,487,415
BRAKE LUBRICATOR
Filed Jan. 21, 1948
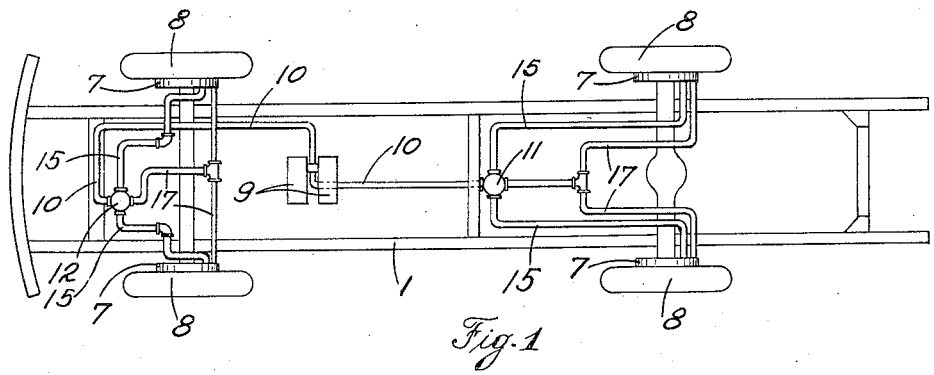
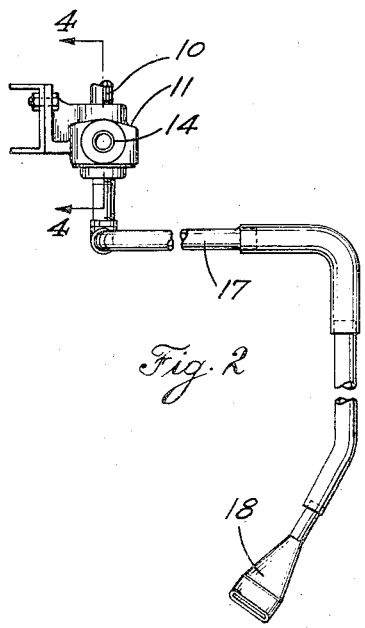
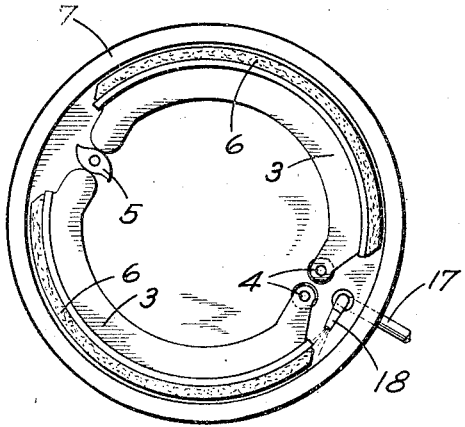
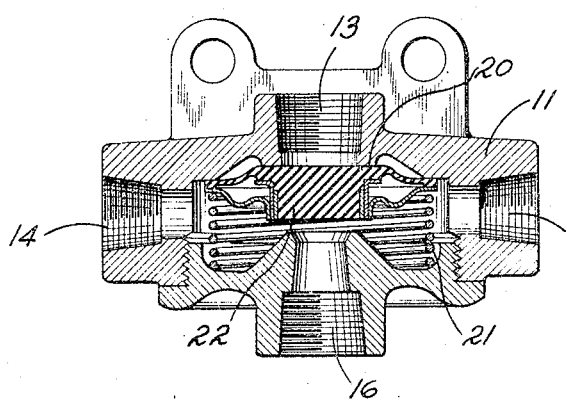
INVENTOR.
ARTHUR W. BENNETT
BY
Richey Watts
ATTORNEYS Patented Nov. 8, 1949

2,487,415

UNITED STATES PATENT OFFICE 2,487,415

BRAKE LUBRICATOR

Arthur W. Bennett, Erie, Pa., assignor to Erie Coach Company, Erie, Pa., a corporation of Pennsylvania Application January 21, 1948, Serial No. 3,479

1 Claim. (Cl. 188—264)

This invention relates generally to the vehicle braking art and more particularly to brakes which have little or no tendency to cause squealing and howling.

When conventional brakes on buses and trucks are applied, high-pitched sounds are frequently produced which are quite annoying not only to people riding in the buses, but also to people within hearing distance of buses or trucks. These noises are caused under certain conditions when the linings on the brake shoes are pressed against the rotating brake drums. Although many efforts have been made to prevent these noises, none of the proposed expedients with which I am familiar has been entirely satisfactory. On the basis of extensive tests, the present invention has been found to prevent, more or less completely, the creation of these annoying noises.

Briefly described, the present invention comprises the application of air carrying small amounts of moisture to the lining on the brake shoes, preferably after each application of the brakes. While the invention may be embodied in various forms of apparatus, a simple form comprises means for actuating the brake shoes by use of compressed air and means for delivering the exhaust air, after application of the brakes, to a place adjacent to the lining of a brake shoe.

The present invention will be better understood by those skilled in the art from the following specification and the drawings accompanying and forming a part of the same, in which:

Fig. 1 is a plan view generally schematic in nature showing apparatus embodying the present invention associated with a vehicle frame and brakes;

Fig. 2 is a side elevational view showing the relief valve of Fig. 1, and a conduit leading from the exhaust port thereof;

Fig. 3 is a side elevational view of a brake drum equipped with the exhaust air conduit of Fig. 2; and Fig. 4 is a cross-sectional view taken on line 4—4 of Fig. 2.

In the drawings, frame 1 of a vehicle, which may, for example, be for a bus, is provided with brake shoes 3 pivotally supported at one end on pins 4 and engaging an expander 5 at their other ends. The shoes 3 are provided with conventional liners 6 which may consist, for example, of asbestos fiber and a suitable binder with, or without, other ingredients. The brake shoes may be moved outwardly by expander 5 to press the liners of the shoes against the inner surface of brake drums 7 carried by the vehicle wheels 8. The expanders 5 are actuated in the conventional manner by pistons movable in compressed air cylinders (not shown).

A compressed air reservoir 9 is carried by the frame 1 and is connected by conduits 10 to two 3-way valves 11 and 12. Since these valves are conventional in construction and may be similar structurally, a description of one will suffice for both.

The valve 11 has an inlet port 13 connected to conduit 10 for leading compressed air from the reservoir source 9 to the valve; and also has outlet ports 14 connected by conduits 15 to the cylinders which house the pistons which actuate expanders 5. The valve 11 also has an exhaust port 16 through which air used to actuate the brake shoes may quickly escape when the brakes are to be released. A conduit 17 leads from this exhaust port to points adjacent to the pivoted ends of the brake shoes 3. This conduit may be provided with a nozzle 18 at its outlet and to deliver the exhaust air in a wide stream against the lining at the pivoted end of the brake shoe and between that lining and the brake drum.

The operation of the device will be readily understood from the following description:

When fluid pressure is admitted from reservoir 9 to valve 11 as through inlet 13, the diaphragm 20 is forced downwardly with the resultant compression of spring 21 and seating of the plug part 22 of the diaphragm on the valve body surrounding the outlet 16 and connecting inlet 13 with outlets 14 to the brake actuating cylinders (not shown). When the fluid pressure applied through inlet opening 13 is decreased sufficiently, the diaphragm returns to the position shown in Fig. 4 where the inlet opening is sealed and the outlet opening 16 is connected with outlet openings 14. Thereupon, fluid pressure in the brake actuating cylinders escapes through outlet 16 into conduit 17 and thence through nozzle 18 into the space within the brake drum adjacent to the brake lining on the shoes.

The valve 12 operates substantially the same as valve 11 as just described and accordingly it is believed that no detailed description of valve 12 is required.

It will be understood that the air which is used to actuate the brake shoes will carry some moisture, and that such moisture, and possibly other amounts which separate out upon release of the pressure on the air, will be carried by the air into the brake drums and there brought into contact with the lining on the brake shoes, The effect of using this exhaust air is that the condition of the lining on the shoes is altered to such an extent that the disagreeable squeals and howls are no longer produced, or if so, only to a minor extent. By releasing the exhaust air into the brake drum after each application of the brake, the linings of the shoes are maintained at all times in a condition conducive to quiet operation and absence of squeals and howls.

Although I have shown and described herein one specific embodiment of the present invention, it will be understood that many different embodiments of it may be made including the substitution of different types of relief valves, conduits, nozzles and the like. However, I wish it to be understood that all such variations which do not amount to invention are intended to be included within the scope of this invention which is set forth in what is claimed.

Having thus described the present invention so that others skilled in the art may be able to understand and practice the same, I state that what I desire to secure by Letters Patent is defined in what is claimed.

What is claimed is:

Brake lubricating means comprising a brake drum containing air at atmospheric pressure, brake shoes and liners thereon in said drum, compressed air actuated means for actuating said shoes, an air valve having inlet, outlet and exhaust ports, pipes connecting a source of compressed air with said inlet port and connecting said outlet port with said air actuated means, a conduit leading from said exhaust port into said drum for conducting compressed air discharged from said air actuated means to said drum, and a nozzle on the conduit within the drum and disposed closely adjacent to one end of a brake shoe lining to discharge exhaust compressed air from said conduit directly onto the end of the adjacent liner and to deposit on said liner moisture dropping out of the compressed air when it is released into the air at atmospheric pressure in the said drum.

ARTHUR W. BENNETT.

REFERENCES CITED

The following references are of record in the file of this patent:

UNITED STATES PATENTS

| Number | Name | Date |
|---|---|---|
| 714,497 | Mailloux | Nov. 25, 1902 |
| 878,454 | Caillet | Feb. 4, 1908 |
| 1,271,163 | Hartford | July 2, 1918 |
| 2,378,100 | Pogue | June 12, 1945 |
| 2,381,484 | Blank | Aug. 7, 1945 |